United States Patent [19]

Iadonato et al.

[11] Patent Number: 5,628,021

[45] Date of Patent: *May 6, 1997

[54] SYSTEM AND METHOD FOR ASSIGNING TAGS TO CONTROL INSTRUCTION PROCESSING IN A SUPERSCALAR PROCESSOR

[75] Inventors: Kevin R. Iadonato, San Jose; Trevor A. Deosaran, Sunnyvale; Sanjiv Garg, Fremont, all of Calif.

[73] Assignee: Seiko Epson Corporation, Japan

[*] Notice: The term of this patent shall not extend beyond the expiration date of Pat. No. 5,604,912.

[21] Appl. No.: 224,328

[22] Filed: Apr. 4, 1994

Related U.S. Application Data

[63] Continuation-in-part of Ser. No. 999,648, Dec. 31, 1992.

[51] Int. Cl.$^6$ ............................................ G06F 9/30
[52] U.S. Cl. ............... 395/800; 395/375; 364/DIG. 1; 364/231.8; 364/262.4; 364/262.9
[58] Field of Search ............................ 395/800, 425, 395/375

[56] References Cited

U.S. PATENT DOCUMENTS

| | | | |
|---|---|---|---|
| 4,881,167 | 11/1989 | Sasaki et al. | 364/200 |
| 4,903,196 | 2/1990 | Pomerene et al. | 364/200 |
| 4,992,938 | 2/1991 | Cocke et al. | 364/200 |
| 5,067,069 | 11/1991 | Fite et al. | 395/375 |
| 5,109,495 | 4/1992 | Fite et al. | 395/375 |
| 5,120,083 | 6/1992 | Fite et al. | 395/375 |
| 5,142,633 | 8/1992 | Murray et al. | 395/375 |
| 5,214,763 | 5/1993 | Blaner et al. | 395/375 |
| 5,226,126 | 7/1993 | McFarland et al. | 395/375 |
| 5,251,306 | 10/1993 | Tran | 395/375 |
| 5,255,384 | 10/1993 | Sachs et al. | 395/425 |
| 5,261,071 | 11/1993 | Lyon | 395/425 |
| 5,285,527 | 2/1994 | Crick et al. | 395/425 |
| 5,317,720 | 5/1994 | Stamm et al. | 395/425 |
| 5,345,569 | 9/1994 | Tran | 395/375 |
| 5,398,330 | 3/1995 | Johnson | 395/575 |
| 5,487,156 | 1/1996 | Popescu et al. | 395/375 |

FOREIGN PATENT DOCUMENTS

| | | |
|---|---|---|
| 0378195 | 7/1990 | European Pat. Off. . |
| 0515166 | 12/1991 | European Pat. Off. . |
| WO8809035 | 11/1988 | WIPO . |

OTHER PUBLICATIONS

John L. Hennessey and David A. Patterson, *Computer Architecture A Quantitative Approach*, Ch. 6.4, 6.7, and p. 449, 1990.

Bruce D. Lightner and Gene Hill, "The Metaflow Lightning Chipset*", pp. 13–16, *IEEE Publication*, 1991.

Peleg et al., "Future Trends in Microprocessors: Out-of-Order Execution, Spec. Branching and Their CISC Performance Potential", Mar. 1991.

(List continued on next page.)

*Primary Examiner*—Larry D. Donaghue
*Attorney, Agent, or Firm*—Sterne, Kessler, Goldstein & Fox P.L.L.C.

[57] ABSTRACT

A tag monitoring system for assigning tags to instructions. A source supplies instructions to be executed by a functional unit. A register file stores information required for the execution of each instruction. A queue having a plurality of slots containing tags which are used for tagging the instructions. The tags are arranged in the queue in an order specified by the program order of their corresponding instructions. A control unit monitors the completion of executed instructions and advances the tags in the queue upon completion of an executed instruction. The register file stores an instruction's information at a location in the register file defined by the tag assigned to that instruction. The register file also contains a plurality of read address enable ports and corresponding read output ports. Each of the slots from the queue is coupled to a corresponding one of the read address enable ports. Thus, the information for each instruction can be read out of the register file in program order.

62 Claims, 7 Drawing Sheets

OTHER PUBLICATIONS

Dywer, *A Multiple, Out-of-Order Instruction Issuing System for Superscalar Processors*, (All), Aug. 1991.

Keller, R., "Look-Ahead Processors", *Computing Surveys*, vol. 7, No. 4, Dec. 1975.

*Critical Issues Regarding HPS, A High Performance Microarchitecture*, Yale N. Patt, Stephen W. Melvin, Wen-mei Hwu, and Michael G. Shebanow; The 18th Annual Workshop on Microprogramming, Pacific Grove, California, Dec. 3-6, 1985; IEEE Computer Order No. 653, pp. 109-116.

*HPS, A New Microarchitecture: Rationale and Introduction*, Yale N. Patt, Wen-mei Hwu, and Michael Shebanow; The 18th Annual Workshop on Microprogramming, Pacific Grove, California, Dec. 3-6, 1985; IEEE Computer Society Order No. 653, pp. 103-108.

Popescu et al., *The Metaflow Architecture*, IEEE Micro, vol. 11, No. 3, Jun. 1991, pp. 10-13 and 63-73.

Johnson, *Superscalar Microprocessor Design*, (Prentice-Hall, Inc., Englewood Cliffs, New Jersey, 1991).

Mike Johnson, *Superscalar Microprocessor Design*, 1991 pp. 127-146.

SYSTEM AND METHOD FOR ASSIGNING TAGS TO CONTROL INSTRUCTION PROCESSING IN A SUPERSCALAR PROCESSOR

This is a Continuation-In-Part of a co-pending application entitled "System And Method For Assigning Tags To Instructions To Control Instruction Execution", Ser. No. 07/999,648, filed on Dec. 31, 1992.

BACKGROUND OF THE INVENTION

1. Field of the Invention

The present invention relates generally to superscalar computers, and more particularly, a system and method for using tags to control instruction execution in a superscalar reduced instruction set computer (RISC).

2. Related Art

Processors used in conventional computer systems typically execute program instructions one at a time, in sequential order. The process of executing a single instruction involves several sequential steps. The first step generally involves fetching the instruction from a memory device. The second step generally involves decoding the instruction, and assembling any operands.

The third step generally involves executing the instruction, and storing the results. Some processors are designed to perform each step in a single cycle of the processor clock. Alternatively, the processor may be designed so that the number of processor clock cycles per step depends on the particular instruction.

To improve performance, modern computers commonly use a technique known as pipelining. Pipelining involves the overlapping of the sequential steps of the execution process. For example, while the processor is performing the execution step for one instruction, it might simultaneously perform the decode step for a second instruction, and perform a fetch of a third instruction. Pipelining can thus decrease the execution time for a sequence of instructions.

Another class of processors improve performance by overlapping the sub-steps of the three sequential steps discussed above are called superpipelined processors.

Still another technique for improving performance involves executing multiple instructions simultaneously. Processors which utilize this technique are generally referred to as superscalar processors. The ability of a superscalar processor to execute two or more instructions simultaneously depends on the particular instructions being executed. For example, two instructions which both require the use of the same, limited processor resource (such as a floating point unit) cannot be executed simultaneously. This type of conflict is known as a resource dependency. Additionally, an instruction which uses the result produced by the execution of another instruction cannot be executed at the same time as the other instruction. An instruction which depends on the result of another instruction is said to have a data dependency on the other instruction. Similarly, an instruction set may specify that particular types of instructions must execute in a certain order relative to each other. These instructions are said to have procedural dependencies.

A third technique for improving performance involves executing instructions out of program order. Processors which utilize this technique are generally referred to as out-of-order processors. Usually, out-of-order processors are also superscalar processors. Data dependencies and procedural dependencies limit out-of-order execution in the same way that they limit superscalar execution.

From here on, the term "superscalar processor" will be used to refer to a processor that is: capable of executing multiple instructions simultaneously, or capable of executing instructions out of program order, or capable of doing both.

For executing instructions either simultaneously or out of order, a superscalar processor must contain a system called an Execution Unit. The Execution Unit contains multiple functional units for executing instructions (e.g., floating point multiplier, adder, etc.). Scheduling control is needed to dispatch instructions to the multiple functional units. With in-order issue, the processor stops decoding instructions whenever a decoded instruction creates a resource conflict or has a true dependency or an output dependency on a uncompleted instruction. As a result, the processor is not able to look ahead beyond the instructions with the conflict or dependency, even though one or more subsequent instructions might be executable. To overcome this limitation, processors isolate the decoder from the execution stage, so that it continues to decode instructions regardless of whether they can be executed immediately. This isolation is accomplished by a buffer between the decode and execute stages, called an instruction window.

To take advantage of lookahead, the processor decodes instructions and places them into the window as long as there is room in the window and, at the same time, examines instructions in the window to find instructions that can be executed (that is, instructions that do not have resource conflicts or dependencies). The instruction window serves as a pool of instructions, giving the processor lookahead ability that is constrained only by the size of the window and the capability of the instruction source. Thus, out-of-order issue requires a buffer, called an instruction window between the decoder and functional units; and the instruction window provides a snap-shot of a piece of the program that the computer is executing.

After the instructions have finished executing, instructions must be removed from the window so that new instructions can take their place. Current designs employ an instruction window that utilizes a First In First Out queue (FIFO). In certain designs, the new instructions enter the window and completed instructions leave the window in fixed size groups. For example, an instruction window might contain eight instructions (I0–I7) and instructions may be changed in groups of four. In this case, after instructions I0, I1, I2 and I3 have executed, they are removed from the window at the same time four new instructions are advanced into the window. Instruction windows where instructions enter and leave in fixed size groups are called "Fixed Advance Instruction Windows."

In other types of designs, the new instructions enter the window and completed instructions leave the window in groups of various sizes. For example, an instruction window might contain eight instructions (I0–I7) and may be changed in groups of one, two or three. In this case, after any of instructions I0, I1 or I2 have executed, they can be removed from the window and new instructions can be advanced into the window. Instruction windows where instructions enter and leave in groups of various sizes are called "Variable Advance Instruction Windows."

Processors that use Variable Advance Instruction Windows (VAIW) tend to have higher performance than processors that have Fixed Advance Instruction Windows (FAIW). However, fixed advance instruction windows are easier for a processor to manage since a particular instruction can only occupy a fixed number of locations in the window. For example, in an instruction window that contains eight instructions (I0–I7) and where instructions can be added or removed in groups of four, an instruction can occupy only one of two locations in the window (e.g., I0 and I4). In a variable advance instruction windows, that instruction could occupy all of the locations in the window at different times, thus a processor that has a variable advance instruction window must have more resources to track each instruction's position than a processor that has a fixed advance instruction window.

Current designs use large queues to implement the instruction window. The idea of using queues is disadvantageous, for many reasons including: a large amount of chip area resources are dedicated to a plurality of queues especially when implementing a variable advance instruction window; there is limited flexibility in designing a system with more than one queue; and control logic for directing data in queues is complex and inflexible.

Therefore, what is needed is a technique to "track" or monitor instructions as they move through the window. The system must be flexible and require a small area on a chip.

SUMMARY OF THE INVENTION

The present invention is directed to a technique for monitoring instruction execution of multiple instructions in parallel and out of program order using a system that assigns tags to the multiple instructions and maintains an instruction window that contains the multiple instructions. The system is a component of a superscalar unit which is coupled between a source of instructions and functional units which execute the instructions. The superscalar unit is in charge of maintaining the instruction window, directing instructions to the various functional units in the execution unit, and, after the instructions are executed, receiving new instructions from the source.

The present invention employs a tag monitor system, which is a part of the superscalar unit. The tag monitor system includes: a register file and a queue that operates on a First-In-First-Out basis (the queue is a multiple-advance, multiple output, recycling FIFO). The queue is coupled to the register file. The register file is coupled to the instruction source and is used to store instruction information (i.e., the resource requirements of each instruction). When an instruction is sent from the instruction source to the register file it is assigned a tag that is not currently assigned to any other instruction. The instruction information is then stored in the register file at an address location indicated by the tag of the instruction. Once an instruction's information is stored in the register file, it is said to be "in the instruction window." The tags of each instruction in the instruction window are stored in the queue. The tags are arranged in the queue in the same order as their corresponding instructions are arranged in the program.

When an instruction is finished, the queue advances and the tag of the instruction is effectively pushed out the bottom of the queue. The tag can then be reassigned to a new instruction that enters the instruction window. Accordingly, the tag is sent back to the top of the queue (in other words, it is recycled). It is also possible for several tags to be recycled at the same time when several instructions finish at the same time. In a preferred embodiment, instructions are required to finish in order. This is often necessary to prevent an instruction from incorrectly overwriting the result of another instruction. For example, if a program contains two instructions that write to the same location of memory, then the instruction that comes first in the program should write to the memory before the second. Thus, the results of instructions that are executed out of order must be held in some temporary storage area and the instructions themselves must remain in the instruction window until all previous instructions have been executed. When a group of instructions is completed, all of their results are moved from the temporary storage area to their real destinations. Then the instructions are removed from the window and their tags are recycled.

The register file has write ports where new instruction information is received from the instruction source. The register file has a number of write ports equal to the number of new instructions that can be added to the window at one time. The register file has one entry for each instruction in the window. The register file also has one output port for every instruction in the window. Associated with each output port is an address port. The address port is used to select which register file entry's contents will be output on its corresponding output port.

The queue has an output for each slot (e.g., specific buffer location in the queue) that shows the value of the tag stored in that slot. These outputs are connected to the read address ports of the register file. This connection causes the register file to provide an entry's contents on its corresponding output port when a tag valve is presented by the queue to the read address ports. The outputs of the register file are sent to various locations in the superscalar unit and execution units where the instruction information is used for instruction scheduling, instruction execution, and the like.

It is possible that some of the locations in the instruction window may be empty at any given time. These empty window locations are called "bubbles." Bubbles sometimes occur when an instruction leaves the window and the instruction source cannot immediately send another instruction to replace it. If there are bubbles in the window, then some of the entries in the register file will contain old or bogus instruction information. Since all of the data in the register file is always available, there needs to be some way to qualify the data in the register file.

According to the present invention, a "validity bit" is associated with each entry in the instruction window to indicate if the corresponding instruction information in the register file is valid. These validity bits can be held in the tag FIFO with the tags. There is one validity bit for each tag in the FIFO. These bits are updated each time a tag is recycled. If, when a tag is recycled, it gets assigned to a valid instruction, then the bit is asserted. Otherwise it is deasserted.

The validity bits are output from the tag monitor system along with the outputs of the register file. They are sent to the same locations as the outputs of the register file so that the superscalar unit or execution units will know if they can use the instruction information.

A feature of the present invention is that an instruction window can be maintained without storing instruction information in large queues. This simplifies design and increases operational flexibility. For example, for a window containing n instructions, the tag monitor system would contain a queue with n entries and a register file with n entries and n output ports. If each output of the queue is connected to its corresponding read address port on the register file (e.g., output 0 connected to read address port 0, output 1 connected to read address port 1, etc.) then the register file outputs will "display" (i.e., make available at the output ports) the information for each instruction in the window in program order (e.g., output port 0 will show instruction 0's information, output port 1 will show instruction 1's information, etc.). When the window advances, the queue advances and the addresses on the read address ports change. This causes the outputs of the register file to change to reflect the new arrangement of instructions in the window. It is necessary for the instruction information to be displayed in order on the register file outputs so that it can be sent to the rest of the superscalar unit in order. The superscalar unit needs to know the order of the instructions in the window so that it can schedule their execution and their completion.

Further features and advantages of the present invention, as well as the structure and operation of various embodiments of the present invention, are described in detail below with reference to the accompanying drawings.

DETAILED DESCRIPTION OF THE INVENTION

1.0 System Environment

Figure 1:
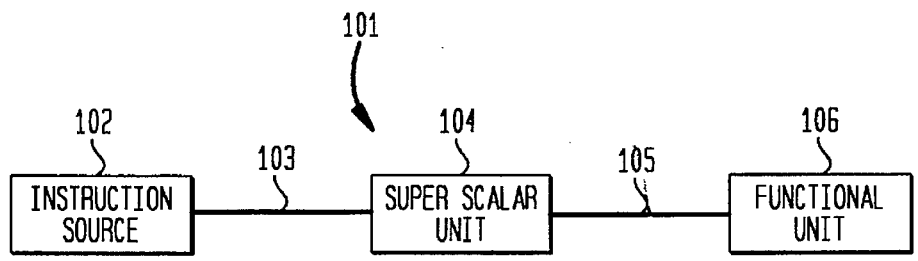
FIG. 1 shows a representative block diagram of a superscalar environment of the present invention.

FIG. 1 is a block diagram of a superscalar environment 101. Superscalar environment 101 includes: an instruction source 102, a superscalar unit 104 and a functional unit 106. Superscalar unit 104 controls the execution of instructions by functional unit 106. Functional unit 106 may include a floating point unit (not shown), an integer unit (not shown), a load/store unit (not shown) and other such hardware commonly used by processors depending on the desired application. Specific implementations of instruction source 102 and functional unit 106 would be apparent to a person skilled in the relevant art.

Instruction source 102 sends instruction information to superscalar unit 104 via a bus 103. The superscalar unit 104 then issues the instructions to functional unit 106. Generally, superscalar unit 104 monitors functional unit 106 availability and checks for dependencies between instructions. Once the instructions are completed, instruction source 102 sends more instruction information to superscalar unit 104.

The buses shown in FIG. 1 represent data and control signals. Bus and instruction size may vary depending on the application. The remaining discussion will be focused on a tag monitor system, which tracks instructions for superscalar unit 104.

2.0 Structure and Operation of the Tag Monitor System

A. Structure

Figure 2:
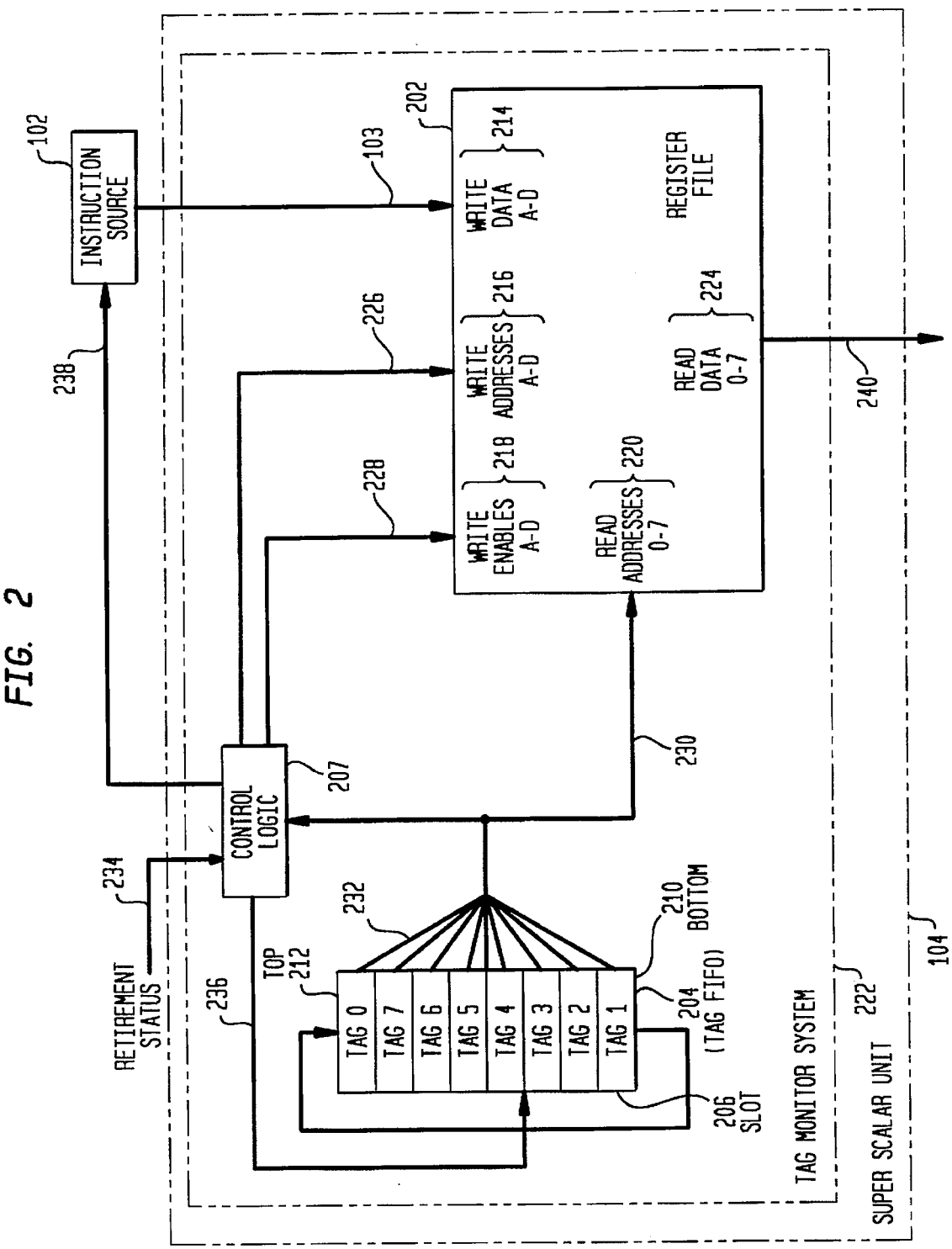
FIG. 2 shows a representative block diagram of a tag monitoring system of the present invention.

FIG. 2 shows a block diagram of a tag monitor system 222 located within a portion of superscalar unit 104 (shown as the inner dashed line in FIG. 2). Tag monitor system 222 includes: a register file 202, a tag FIFO 204 and control logic 207.

Tag FIFO 204 is a multiple advance, multiple output, recycling FIFO that stores tags in a plurality of slots 206. The term "multiple advance" means that the FIFO can be advanced any number of slots at a time. For example, a multiple advance 4-slot FIFO can be advanced 0–3 slots at a time. The term "multiple output" means that the contents of each slot of the FIFO are available. A tag is a unique label that superscalar unit 104 assigns to each instruction as it enters the instruction window. Tag FIFO 204 has one slot 206 for each instruction in the window. Each slot 206 has an output 232 that indicates (i.e., outputs) the value of the tag in the corresponding slot 206. Each slot 206 also has a validity bit that indicates whether the instruction assigned to the tag in the slot 206 is valid. In a preferred embodiment, tag FIFO 204 contains eight slots 206. Each of these slots 206 contains a unique binary number (tag) ranging from 0 to 7. For example a tag is three bits (e.g., 000, 001, 010, etc.) which, with the validity bit, causes each slot to hold four bits. Thus each output 232 is four bits wide. Each slot 206 of tag FIFO 204 is loaded with a unique tag when the chip is powered-on or reset.

Once a tag is assigned to an instruction, it will remain with that instruction until the instruction is removed from the window. Once an instruction is removed from the window, its tag is sent back to the top 212 of tag FIFO 204. The tag sent to top 212 can be reassigned to a new instruction that enters the window. In this fashion, tags are "recycled" or are recirculated in tag FIFO 204. Generally, tags advance through the tag FIFO 204 from top 212 to bottom 210. Thus, FIFO 204 is called a recycling queue.

Register file 202 is coupled to tag FIFO 204 and instruction source 102. Register file 202 stores instruction information sent by instruction source 102. The following are examples of the type of information that can be sent from instruction source 102 to register file 202: decoded instruction information; instruction functional unit requirements; the type of operation to be performed by the instruction; information specifying a storage location where instruction results are to be stored; information specifying a storage location where instruction operands are stored; information specifying a target address of a control flow instruction; and information specifying immediate data to be used in an operation specified by the instruction.

Register file 202 includes: a write data port 214, a write address port 216, a write enable port 218, a read address port 220, and a read data port 224.

Write data port 214 receives instruction information from instruction source 102 via bus 103. Write address ports 216 specify what addressable location in register file 202 the instruction information that is received through write data ports 214 is to be stored. Write address ports 216 are coupled to control logic 207 via a bus 226. Write enable ports 218 indicate when to write data from instruction source 102 into register file 202. Write enable ports are coupled to control logic 207 via bus 228. In a preferred embodiment (shown in FIG. 2) register file 202 has four write data ports 214 labeled A through D. Write data ports 214 have corresponding write address ports 216 labeled A through D, and corresponding write enable ports 218 also labeled A through D.

Read address port 220 is coupled to tag FIFO 204 via bus 230. Bus 230 carries outputs 232 of each slot 206 of tag FIFO 204. Read address ports 220 select the instruction information that will be accessed through read data ports 224. Each read address port 220 has a corresponding read data port 224. In a preferred embodiment (shown in FIG. 2), the instruction window has eight entries (i.e., the depth of tag fifo 204) and register file 202 has one read address port 220 and one read data port 224 for each instruction in the window. Read address ports 220 are labeled 0 through 7 and their corresponding read data ports 224 are also labeled 0 through 7.

Typically, register file 202 is connected to other elements (e.g. an issuer not shown) located within superscalar environment 101.

Control logic 207 is comprised of logic circuits. Control logic 207 monitors functional unit 106 via a bus 234 and bus 230 from tag FIFO 204. Control logic 207 signals instruction source 102 via bus 238 to send new instruction information to register file 202 as instructions leave the window. Control logic 207 indicates how many new instructions that instruction source 102 should send. In a preferred embodiment (shown in FIG. 2), the maximum number of instructions that can be sent is four, which corresponds to the total number of write data ports 214 in register file 202. Control logic 207 will also synchronize tag FIFO 204 via a bus 236 to advance as instructions leave the window. Thus, under command of control logic 207, tag FIFO 204 advances by as many steps as the number of instructions that leave the window at one time. The control logic 207 also maintains the validity bits stored in tag FIFO 204 via bus 236. The circuit implementation for control logic 207 would be apparent to a person skilled in the relevant art. For example, currently well known and commercially available logic synthesis and layout systems can be used to convert a behavioral description (e.g., Verilog, manufactured by Cadence Design Systems, San Jose, California) to a silicon or chip design.

Note that the bit width of the various buses disclosed herein may support parallel or serial address or data transfer, the selection of which is implementation specific, as would be apparent to a person skilled in the relevant art.

It is also possible for the tag monitor system to contain more than one register file. In a preferred embodiment, the instruction information is distributed among many register files. For example, one register file contains the destination register addresses of each instruction. Another contains the functional unit requirements of each instruction and so on. One advantage to using multiple register files is that it allows the designer to use smaller register files which can be located near where their contents are used. This can make the physical design of the processor easier. The register files' read and write addresses are all connected together and come from the same source. The write data of the register files still comes from the instruction source. However, not all of the register files have to hold all of the information for each instruction. The outputs of each register file only go to where the data held in that register file is needed.

Figure 4:
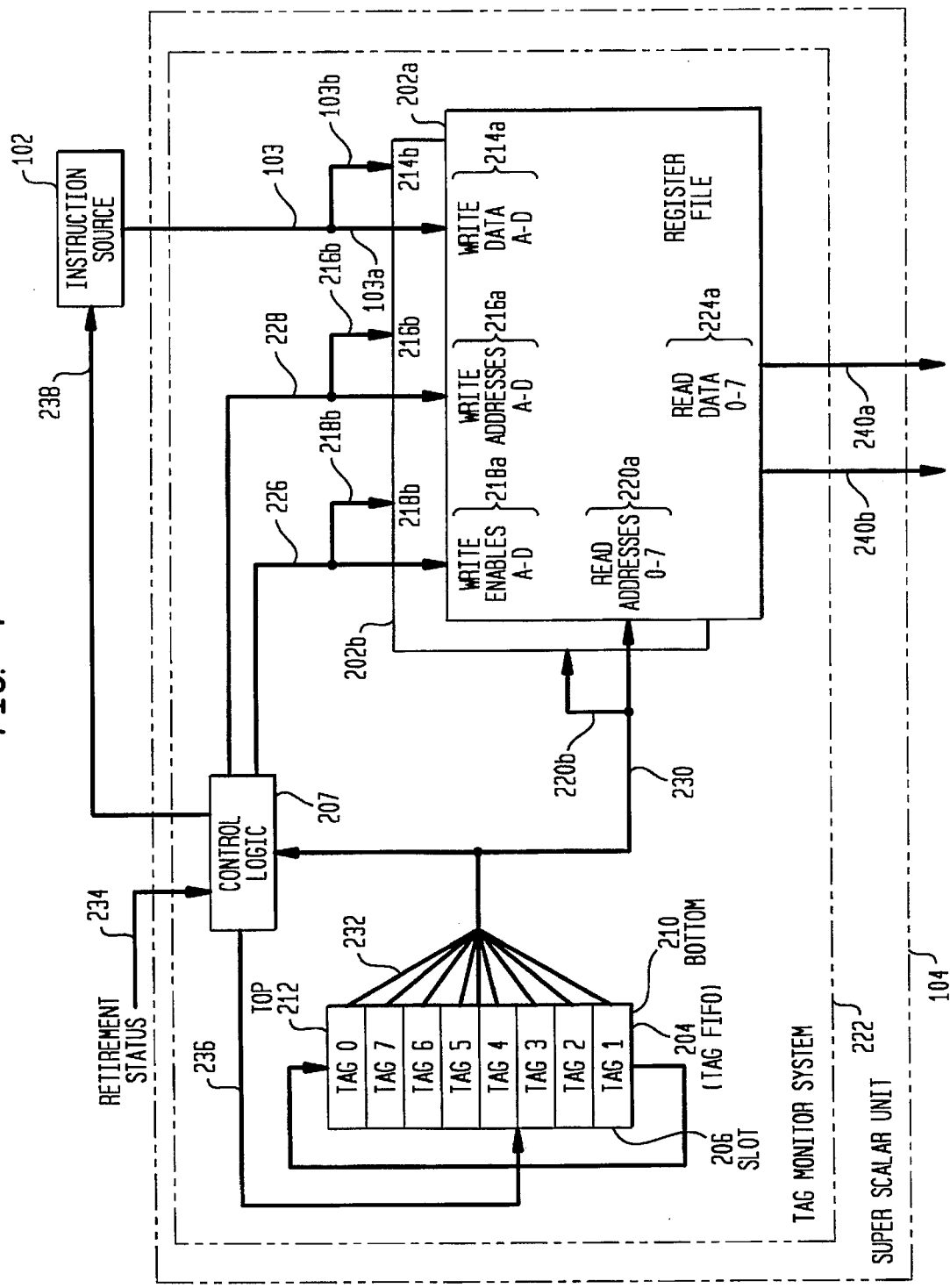
FIG. 4 shows a tag monitor system that contains two register files.

FIG. 4 shows a tag monitor system 222 that contains two register files 202a and 202b. In a preferred embodiment, only a portion of each instruction's information is stored in each register file 202a and 202b. So the data sent on bus 103 from the instruction source 102 is divided. One portion 103a is sent to register file 202a and the other 103b is sent to register file 202b. Both register files 202a and 202b are connected to buses 226 and 228 that provide control signals from the control logic 207 and to bus 230 that provides the outputs from tag FIFO 204. The outputs of register files 202a and 202b are provided on separate buses 240a and 240b to different locations throughout the superscalar unit 104.

The tag FIFO 204 will now be described with the reference to example embodiments.

Figure 5:
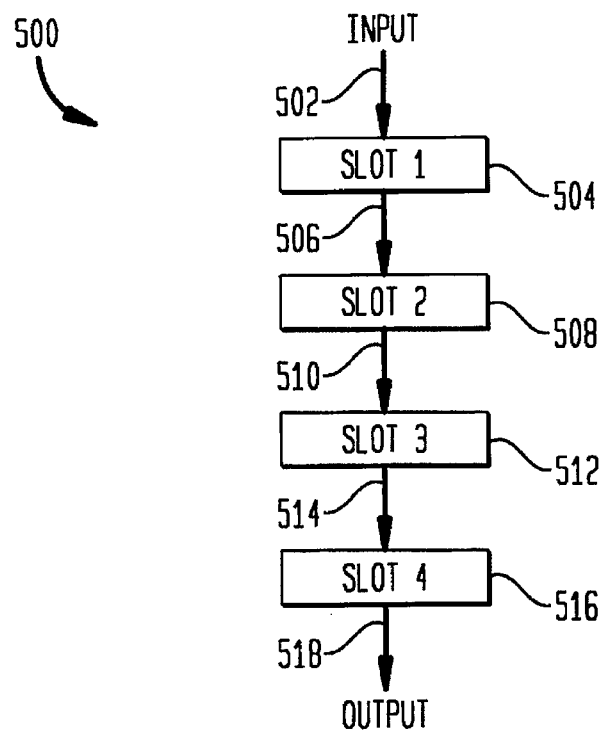
FIG. 5 shows a diagram of a simple FIFO.

FIG. 5 shows a diagram of a FIFO 500. FIFO 500 holds four pieces of data in its four slots 504, 508, 512 and 516.

The four slots are connected via buses 506, 510 and 514. FIFO 500 has an input 502 and and output 518 through which data enters and leaves the FIFO 500.

FIFO 500 behaves like a queue with four positions. When FIFO 500 advances, any data in slot 516 leaves FIFO 500 through output 518. Data in slot 512 moves to slot 516 via bus 514. Data in slot 508 moves to slot 512 via bus 510. Data in slot 504 moves to slot 508 via bus 506, and data on the input 502 moves into slot 504. Each of these data transfers happens whenever FIFO 500 advances.

Figure 6:
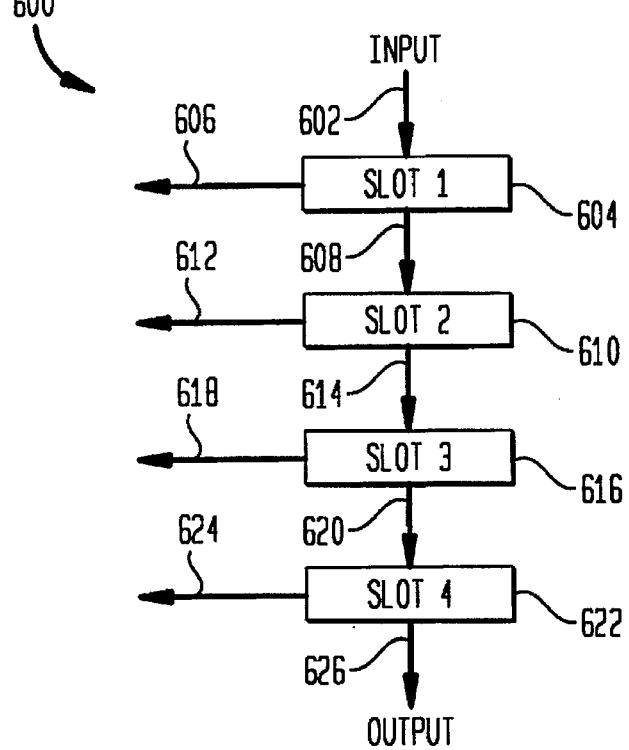
FIG. 6 shows a diagram of a simple FIFO with multiple outputs.

FIG. 6 shows a diagram of a FIFO 600 with multiple outputs. FIFO 600 is structured much like FIFO 500 in FIG. 5. Data enters FIFO 600 through an input 602, moves through four slots 604, 610, 616 and 622 and then out through an output 626. The difference between FIFO 500 and FIFO 600 is that the data stored in each slot 604, 610, 616 and 622 is visible on (i.e., can be read four) corresponding buses 606, 612, 618 or 624 from the time that it enters a respective slot until FIFO 600 advances again. Outputs 606, 612, 618 or 624 allow the user to know what data is stored in FIFO 600 at any given time.

Figure 7:
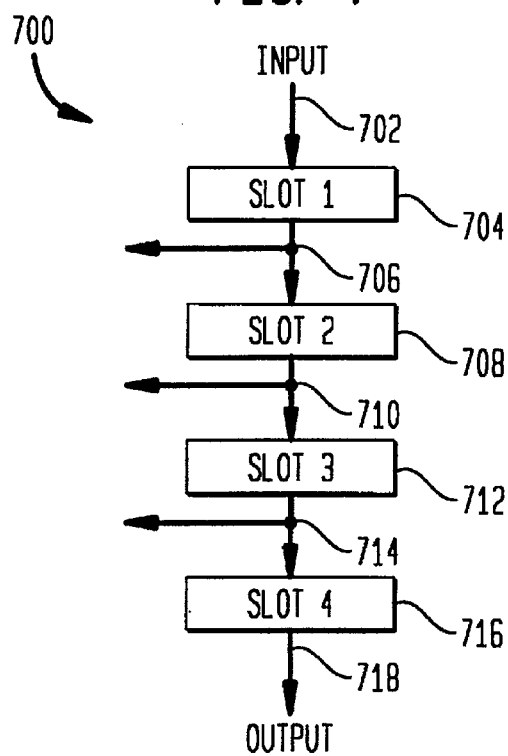
FIG. 7 is a FIFO with multiple output terminals.

In a preferred embodiment, data stored in slots 604, 610, 616 and 622 is continuously visible on each slot's output bus (i.e., on buses 608, 614, 620 and 626). In this situation, buses 606, 612, 618 or 624 are unnecessary. An example of this embodiment is shown in FIG. 7. Buses 706, 710 and 714 are used to convey data between slots 1 and 4 (704, 708, 712 and 716, respectively) and also indicate the contents of slots 1, 2 and 3, 704, 708 and 712 respectively. Output bus 718 always permits the contents of slot 716 to be read.

Figure 8:
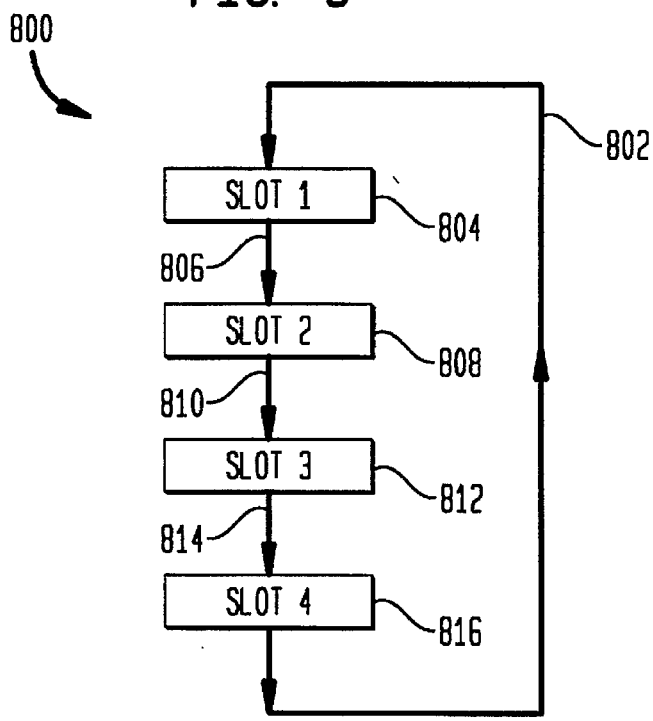
FIG. 8 shows a recycling FIFO.

FIG. 8 shows a recycling FIFO 800. Recycling FIFO 800 also functions much like FIFO 500 in FIG. 5. Recycle FIFO 800 comprises four slots 804, 808, 812 and 816. The main difference is that when FIFO 800 advances, data in slot 816 moves to slot 804. Since FIFO 800 has no means for inputting new data into slot 804, it must be designed so that when turned on or reset, each slot 804, 808, 812 and 816 is initialized with some value. These initial values then circulate through FIFO 800 until reinitialized in a known manner.

Sometimes it is necessary to advance a FIFO by more than one step at a time. Since the FIFO inputs one piece of data each time the FIFO advances on step, the FIFO must also have as many inputs as the maximum number of steps that the FIFO can advance. The FIFO must have some means besides buses to carry the data from each slot or input to the correct destination.

Figure 9:
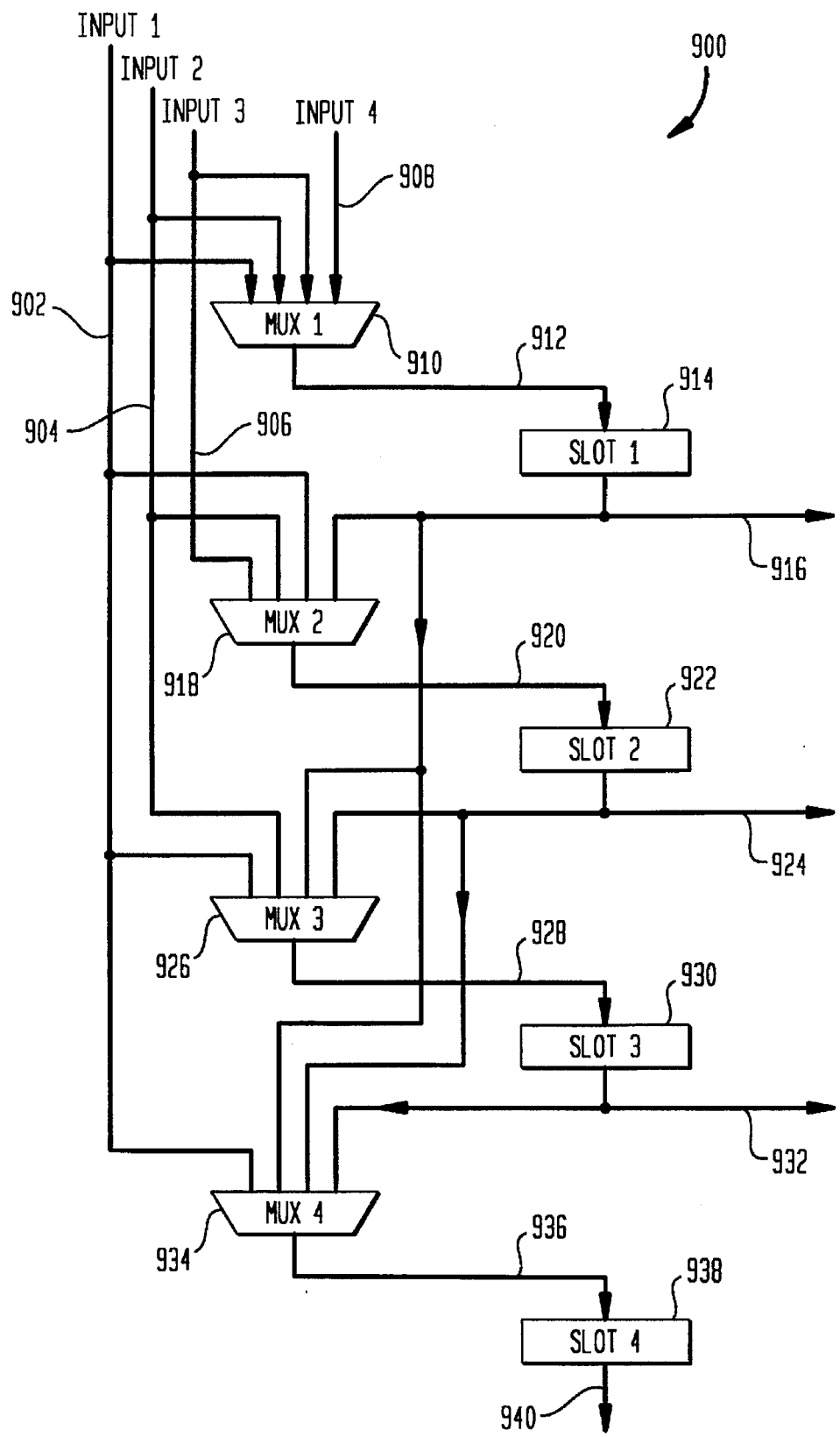
FIG. 9 shows a multiple advance FIFO.

FIG. 9 shows a multiple advance FIFO 900. FIFO 900 is capable of advancing 1, 2, 3 or 4 steps (i.e., slots) at one time. FIFO 900 has four inputs 902, 904, 906 and 908, and four slots 914, 922, 930 and 938. When FIFO 900 advances by four steps, the data on input 902 goes to slot 938, input 904 goes to slot 930, input 906 goes to slot 922 and input 908 goes to slot 914. When FIFO 900 advances by three steps, data in slot 914 goes to slot 938, input 902 goes to slot 930, input 904 goes to slot 922 and input 906 goes to slot 914. In this case, the data on input 908 does not enter FIFO 900. When FIFO 900 advances by two steps, data in slot 922 goes to slot 938, data in slot 914 goes to slot 930, input 902 goes to slot 922 and input 904 goes to slot 914. Finally, as in the simple FIFO case, when the FIFO advances by one step, the data in slot 930 goes to slot 938, the data in slot 922 goes to slot 930, the data in slot 914 goes to slot 922 and the data on input 902 goes to slot 914.

In order to advance more than one step at a time, the inputs must be switchably connected to each slot and the outputs of some slots must go to more than one other slot. Therefore, FIFO 900 has four multiplexers: MUX1, MUX2, MUX3 and MUX4, shown at 910, 918, 926 and 934, respectively. These multiplexers are used to select the data that goes into each slot when FIFO 900 advances. Inputs to each multiplexer are the data that might need to go to its corresponding slot. For example, depending on the number of steps that FIFO 900 advances, the data from slot 914, slot 922, slot 930 or input 902 might go to slot 938. Thus the inputs to 934 are the outputs from slot 916, slot 924, slot 932 and input 902. The structure and operation of the logic circuits necessary to control the multiplexers 910, 918, 926 and 934 would be apparent to a person skilled in the relevant art.

Figure 10:
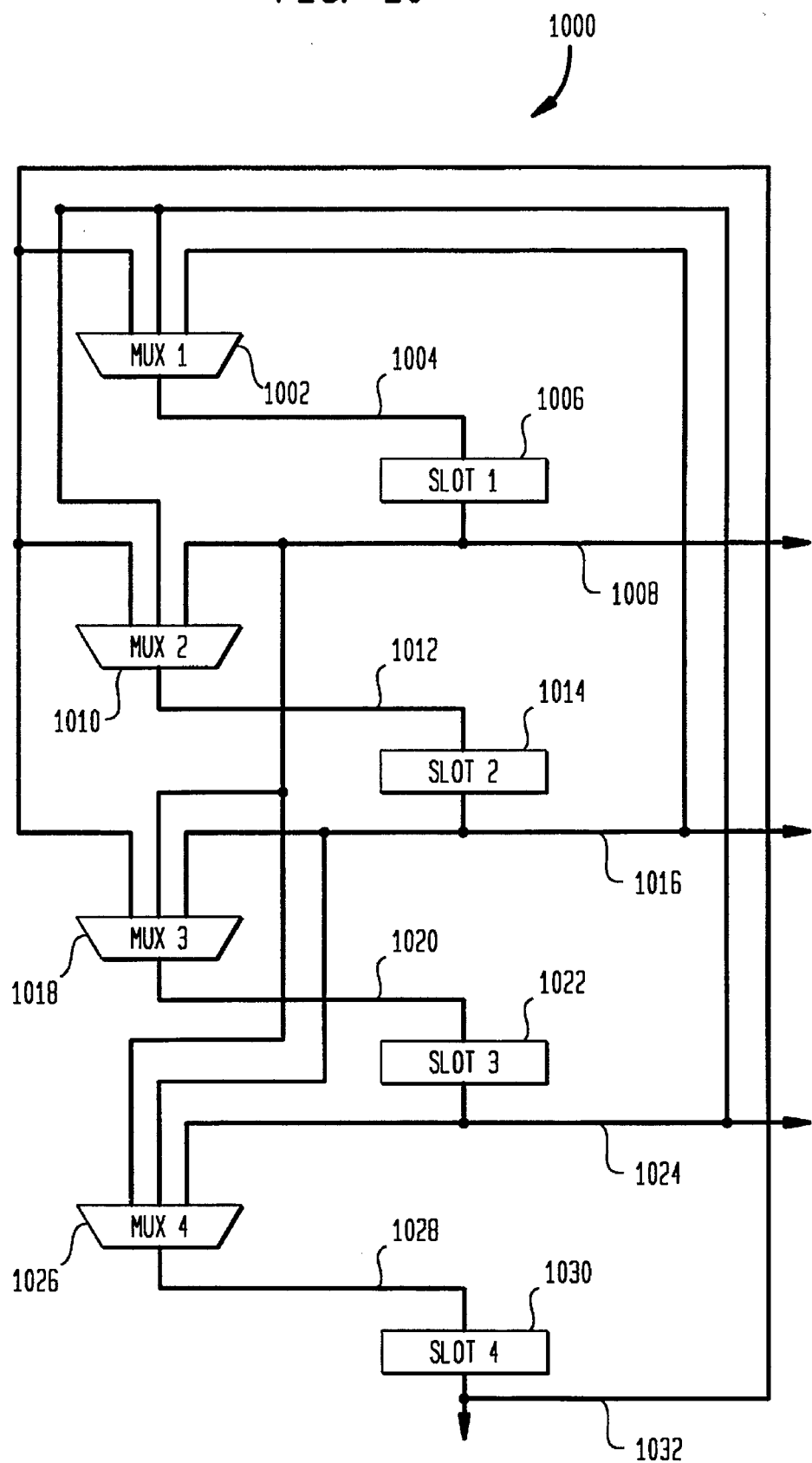
FIG. 10 shows a recycling, multiple-advance FIFO.

It is also possible to design a multiple advance FIFO that recycles its contents. This FIFO is a combination of the FIFOs shown in FIGS. 8 and 9. A diagram of a recycling, multiple advance FIFO 1000 is shown in FIG. 10. FIFO 1000 is capable of being advanced one, two or three steps at a time. Since FIFO 1000 has four stages (slots 1–4, labeled 1006, 1014, 1022 and 1030, respectively), advancing by four steps is logically the same as not advancing at all. Thus, since it never has to advance by four steps, the structure of the multiplexers in the recycling, multiple advance FIFO 1000 is different from that shown in the multiple advance FIFO 900. FIFO 1000 is also a multiple output FIFO like FIFO 700 shown in FIG. 7. Furthermore, like the recycling FIFO 800 in FIG. 8, FIFO 1000 must also have some means for initialization.

The FIFOs shown in FIGS. 5, 6, 7, 8, 9 and 10 are all shown with four stages as an example. It is, of course, possible to modify these designs so that they contain a number of slots other than four. These modifications would be apparent to a person skilled in the relevant art.

B. Operation

Figure 3:
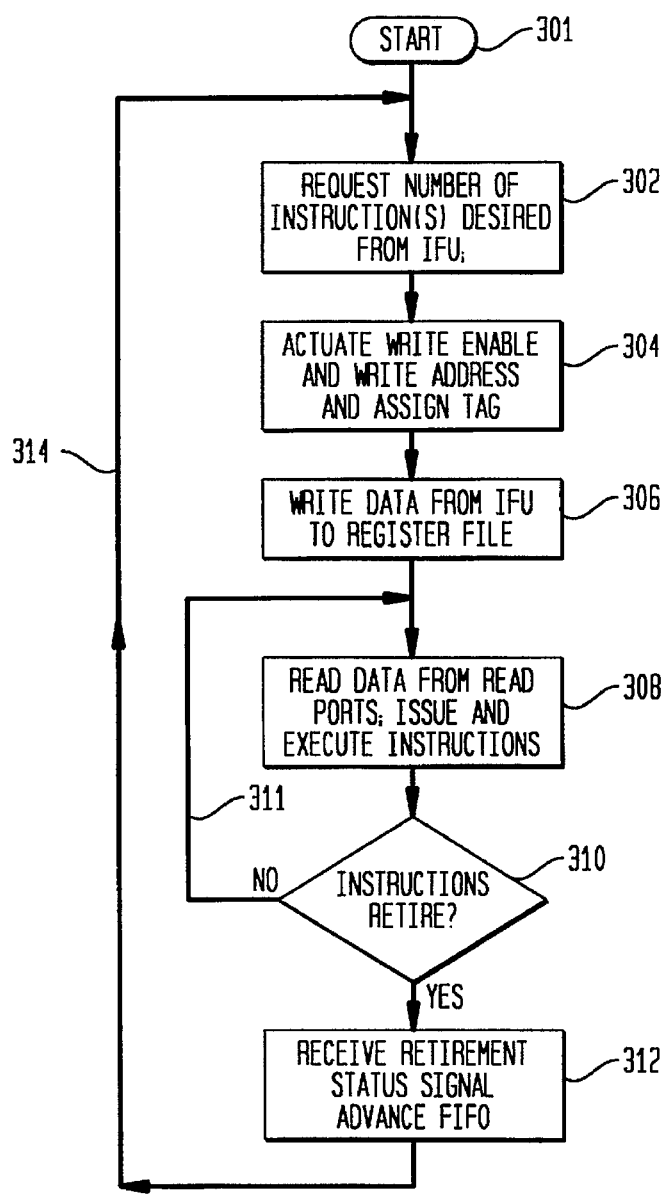
FIG. 3 shows a representative operational flowchart for tag monitoring according to the tag monitoring system of FIG. 2.

FIG. 3 is a flowchart illustrating the operation of tag monitor system 222. Operational steps 310–312 will be described with reference to hardware elements of FIGS. 1 and 2.

Operation starts at a step 301. In a step 302, control logic 207 sends a request data signal 238 requesting instruction source 102 to send instruction information. Control logic 207 requests information for a number of instructions equal to the number of empty spaces in the instruction window. In a preferred embodiment, in effect, control logic 207 determines how many new instructions can be added to the instruction window, and then requests sufficient instruction information from instruction source 102 to refill the empty top slots of the queue. There is a maximum number of instructions whose information can be sent that is less than the number of spaces in the window.

In a step 304, actuate write enable and write address, assign tag and update validity bits. Control logic 207 sends an enable signal on bus 226 and an address signal on bus 228 to write enable port 218 and write address port 216, respectively. The addresses on each port 216 specify where the instruction information on the corresponding data port 214 should be stored in register file 202 during a step 306. Instruction information is sent from instruction source 102 to register file 202 via bus 103. Typically, the total number of enable bits on bus 226 equals the maximum number of instructions whose information can be sent at one time, which in the preferred embodiment is four.

The address where each instruction's information is stored in register file 202 is specified by the tag of that instruction. Since the data on write data ports 214 does not always need to be stored in register file 202, control logic 207 uses enable signals on bus 228 to select only the data that needs to be written. For example, if there is only one empty space at the top of the instruction window, then control logic 207 will send the tag contained in top slot 212 of the queue on bus 228 to write address port 216A and assert write enable port 218A via bus 226. This operation causes only the instruction information on write data port 214A to be stored in register file 202 in a location specified by the tag in top slot 212 of tag FIFO 204. If there are two empty spaces in the instruction window, then control logic 207 will send two enables to ports 218A and 218B and the two tags at the top of the window will be sent to write address ports 216A and 216B (the tag in top slot 212 going to 216B), thus causing the instruction information on ports 214A and 214B to be stored in register file 202. When an instruction's information is stored in a location in register file 202 specified by a tag, the instruction is said to have been "assigned" that tag. Control logic 207 also updates the validity bits in tag FIFO 204 during step 304. If instruction source 102 cannot supply an instruction for every request made in step 302, control logic 207 will only assert the validity bits of the tags that were assigned to valid instructions in step 304. For those tags that do not get assigned, their validity bits will remain unasserted until they are assigned to a valid instruction.

In a step 308, all of the contents of register file 202 are read through read data ports 224. It is contemplated to use less than all the contents of register file 202. The data that is to be read from register file 202 is specified by the addresses presented to register file 202 through read address ports 220. The data is then used in the execution of some or all of the instructions in the window. In a preferred embodiment, read address 220 is always asserted. In other words, there is always a tag in each slot 206.

In a decisional step 310, control logic 207 determines if any of the instructions executed in step 308 are ready to retire. If no instruction retires, data will continue to be read out of register file 202 and the instructions in the window will continue to be executed, as indicated by the "NO" path 311 of decisional step 310. If an instruction does retire, control logic 207 will receive information indicating the number of instructions that are retiring via bus 234 as shown in a step 312. The information received on bus 234 comes from a retirement unit (not shown). The details of the retirement unit are not relevant to carry-out the present invention. (An example, however, of an instruction retirement unit is disclosed in co-pending U.S. application Ser. No. 07/877,451, filed May 15, 1992.) Control logic 207 then indicates, via bus 236, how many steps tag FIFO 204 should advance.

Referring to FIG. 2, if one instruction retires, then tag FIFO 204 will advance by one step. Tag 1 will move from bottom 210 to top 212 into Tag 0's current location, and all other tags will be advanced accordingly. When Tag 1 is moved from the bottom 210 to the top 212, its validity bit is deasserted. Tag 1 will be reassigned to the next new instruction to enter the instruction window. Tag 2 should be located at bottom 210 of tag FIFO 204 after step 312. The operation of tag monitor system 222 will continue by returning to operational step 302 discussed above via branch 314.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A superscalar processor, comprising:

control logic that identifies an increment of advancement in the variable advance instruction window, requests an instruction source to send, to each of a plurality of register files, a portion of instruction information for a set of instructions equal in number to said increment of advancement, and assigns a tag to each new instruction that enters the variable advance instruction window, wherein said tag comprises a unique address in each of said plurality of register files where said portions of instruction information are to be stored; and a recycling queue comprising a plurality of slots equal in number to the predetermined size of the instruction window, each of said plurality of slots containing one of said tags, wherein an order defined by a position of said assigned tags in said recycling queue corresponds to the order of instructions in the variable advance instruction window.

2. The processor of claim 1, wherein said tags in each of said plurality of slots of said recycling queue are used to output said portions of instruction information from each of said plurality of register files.

3. The processor of claim 2, wherein said tags in each of said plurality of slots of said recycling queue are applied to read address ports of said plurality of register files to output said portions of instruction information, in program order, at corresponding read data ports of said plurality of register files.

4. The processor of claim 1, wherein the processor further contains a validity bit associated with each of said plurality of slots, wherein a validity bit of a particular slot identifies whether the corresponding portions of instruction information stored in said plurality of register files at the address identified by said tag in said particular slot are valid.

5. The processor of claim 4, wherein said recycling queue further contains a validity bit associated with each of said plurality of slots, wherein said validity bit associated with a particular slot identifies whether the corresponding portions of instruction information stored in said plurality of register files at the address identified by said tag in said particular slot is valid.

6. The processor of claim 1, wherein said control logic advances said tags in said recycling queue a number of slots equal to the number of instructions leaving the variable advance instruction window.

7. The processor of claim 1, wherein said recycling queue further comprises a plurality of multiplexers that select which tag goes into a particular slot when said recycling queue advances said increment of advancement.

8. The processor of claim 1, wherein decoded instruction information is stored in one of said plurality of register files.

9. The processor of claim 1, wherein a memory address of an instruction is stored in one of said plurality of register files.

10. The processor of claim 1, wherein information specifying functional unit requirements is stored in one of said plurality of register files.

11. The processor of claim 1, wherein information specifying a type of operation to be performed is stored in one of said plurality of register files.

12. The processor of claim 1, wherein a storage location of where instruction results are to be stored is stored in one of said plurality of register files.

13. The processor of claim 1, wherein a target address of an instruction is stored in one of said plurality of register files.

14. The processor of claim 1, wherein information specifying immediate data to be used in an operation specified by an instruction is stored in one of said plurality of register files.

15. A superscalar processor, comprising:

control logic that identifies an increment of advancement in the variable advance instruction window, requests an instruction source to send, to each of a plurality of register files, a portion of instruction information for a set of instructions equal in number to said increment of advancement, and assigns a tag to each new instruction that enters the variable advance instruction window, wherein said tag comprises a unique address in each of said plurality of register files where said portions of instruction information are to be stored; and a recycling queue comprising a plurality of slots, each of said plurality of slots containing one of said tags, wherein an order defined by a position of said assigned tags in said recycling queue corresponds to the order of instructions in the variable advance instruction window, wherein said tags in said plurality of slots of said recycling queue are applied to read address ports of each of said plurality of register files to output said portions of instruction information, in program order, at corresponding read data ports of said plurality of register files.

16. The processor of claim 15, wherein decoded instruction information is stored in one of said plurality of register files.

17. The processor of claim 15, wherein a memory address of an instruction is stored in one of said plurality of register files.

18. The processor of claim 15, wherein information specifying functional unit requirements is stored in one of said plurality of register files.

19. The processor of claim 15, wherein information specifying a type of operation to be performed is stored in one of said plurality of register files.

20. The processor of claim 15, wherein a storage location of where instruction results are to be stored is stored in one of said plurality of register files.

21. The processor of claim 15, wherein a target address of an instruction is stored in one of said plurality of register files.

22. The processor of claim 15, wherein information specifying immediate data to be used in an operation specified by an instruction is stored in one of said plurality of register files.

23. The processor of claim 15, wherein said recycling queue comprises a plurality of slots equal in number to the predetermined size of the instruction window.

24. The processor of claim 15, wherein the processor further contains a validity bit associated with each of said plurality of slots, wherein a validity bit of a particular slot identifies whether the corresponding portions of instruction information stored in said plurality of register files at the address identified by said tag in said particular slot are valid.

25. The processor of claim 24, wherein said recycling queue further contains a validity bit associated with each of said plurality of slots, wherein said validity bit associated with a particular slot identifies whether the corresponding portions of instruction information stored in said plurality of register files at the address identified by said tag in said particular slot are valid.

26. The processor of claim 15, wherein said control means advances said tags in said recycling queue a number of slots equal to the number of instructions leaving the variable advance instruction window.

27. The processor of claim 15, wherein said recycling queue further comprises a plurality of multiplexers that select which tag goes into a particular slot when said recycling queue advances said increment of advancement.

28. A superscalar processor, comprising:
a plurality of functional units; and
a superscalar unit for receiving instructions from an instruction source and issuing instructions to said plurality of functional units, said superscalar unit comprising a monitoring system for tracking instructions in a variable advance instruction window having a predetermined size, said monitoring system comprising:
a plurality of register files for storing portions of instruction information for instructions in said variable advance instruction window;
control logic that identifies an increment of advancement in said variable advance instruction window, requests an instruction source to send, to each of said plurality of register files, a portion of instruction information for a set of instructions equal in number to said increment of advancement, and assigns a tag to each new instruction that enters said variable advance instruction window, wherein said tag comprises a unique address in each of said plurality of register files where said portions of instruction information are to be stored; and
a recycling queue comprising a number of slots equal to said predetermined size of said variable advance instruction window, each of said slots containing one of said tags, wherein an order defined by a position of said assigned tags in said recycling queue corresponds to the order of instructions in said variable advance instruction window;
wherein said tags in each of said plurality of slots of said recycling queue are applied to read address ports of each of said plurality of register files to output said portions of instruction information, in program order, at corresponding read data ports of said plurality of register files.

29. A method for tracking instructions in a variable advance instruction window, the method comprising the steps of:
(a) identifying an increment of advancement in the variable advance instruction window;
(b) requesting an instruction source to send, to a plurality of register files, portions of instruction information for a set of instructions equal in number to said increment of advancement;
(c) assigning a tag to each new instruction that enters the variable advance instruction window, wherein said tag comprises a unique address in each of said plurality of register files where said portions of instruction information are to be stored;
(d) storing portions of instruction information related to each instruction in each of said plurality of register files at locations specified by the tag assigned to that instruction;
(e) storing each tag in a slot of a queue, said queue comprising a number of slots equal in number to the predetermined size of the variable advance instruction window, wherein an order defined by a position of said tags in said queue corresponds to the order of instructions in the variable advance instruction window; and
(f) passing said tags stored in said queue to a plurality of read address ports of said plurality of register files to cause said plurality of register files to output, at a plurality of read data ports of said plurality of register files, the portions of instruction information in program order.

30. The method of claim 29, further comprising the step of advancing said queue a number of slots equal to the number of new instructions determined to be added to the instruction window.

31. The method of claim 29, wherein said step (d) comprises the step of storing decoded instruction information.

32. The method of claim 29, wherein said step (d) comprises the step of storing a memory address of the instruction.

33. The method of claim 29, wherein said step (d) comprises the step of storing information specifying functional unit requirements.

34. The method of claim 29, wherein said step (d) comprises the step of storing information specifying a type of operation to be performed.

35. The method of claim 29, wherein said step (d) comprises the step of storing information specifying a storage location where instruction results are to be stored.

36. The method of claim 29, wherein said step (d) comprises the step of storing information specifying a storage location where instruction operands are stored.

37. The method of claim 29, wherein said step (d) comprises the step of storing information specifying a target address of an instruction.

38. The method of claim 29, wherein said step (d) comprises the step of storing information specifying immediate data to be used in an operation specified by the instruction.

39. The method of claim 31, further comprising the step of storing a valid bit for each tag in said queue, wherein when valid bit is set if the instruction corresponding to the tag associated with the valid bit is valid.

40. The method of claim 29, wherein said step (d) comprises the step of storing instructions.

41. A method for tracking instructions in a variable advance instruction window of a predetermined size, comprising the steps of:
(a) assigning a tag to each new instruction that enters the variable advance instruction window, wherein said tag comprises a unique address within each of a plurality of register files;
(b) storing portions of instruction information related to each instruction in said plurality of register files in a location specified by the tag assigned to that instruction;
(c) storing each tag in a slot of a recycling queue, said recycling queue comprising a number of slots equal to the predetermined size of the variable advance instruction window, wherein an order defined by a position of said tags in said recycling queue corresponds to the order of instructions in the variable advance instruction window.

42. The method of claim 41, further comprising the step of:
(d) using said tags stored in said slots of said queue to output said portions of instruction information in said plurality of register files in program order.

43. The method of claim 42, wherein step (d) comprises the step of passing said tags stored in said slots of said recycling queue to a plurality of read address ports of said plurality of register files to cause said plurality of register files to output said portions of instruction information, in program order, at a plurality of read data ports of said plurality of register files.

44. The method of claim 41, wherein said step (b) comprises the step of storing decoded instruction information.

45. The method of claim 41, wherein said step (b) comprises the step of storing a memory address of the instruction.

46. The method of claim 41, wherein said step (b) comprises the step of storing information specifying functional unit requirements.

47. The method of claim 41, wherein said step (b) comprises the step of storing information specifying a type of operation to be performed.

48. The method of claim 41, wherein said step (b) comprises the step of storing information specifying a storage location where instruction results are to be stored.

49. The method of claim 41, wherein said step (b) comprises the step of storing information specifying a storage location where instruction operands are stored.

50. The method of claim 41, wherein said step (b) comprises the step of storing information specifying a target address of an instruction.

51. The method of claim 41, wherein said step (b) comprises the step of storing information specifying immediate data to be used in an operation specified by the instruction.

52. A method for tracking instructions in a variable advance instruction window of a predetermined size, comprising the steps of:

(a) assigning a tag to each new instruction that enters the variable advance instruction window, wherein said tag comprises a unique address within each of a plurality of register files;

(b) storing portions of instruction information related to each instruction in each of said plurality of register files in a location specified by the tag assigned to that instruction;

(c) storing each tag in a slot of a recycling queue, wherein an order defined by a position of said tags in said recycling queue corresponds to the order of instructions in the variable advance instruction window; and (d) applying said tags in said plurality of slots of said recycling queue to read address ports of said plurality of register files to output said portions of instruction information at corresponding read data ports of said plurality of register files.

53. The method of claim 52, wherein said step (c) comprises the step of storing each tag in a slot of a recycling queue, said recycling queue comprising a plurality of slots equal in number to the predetermined size of the instruction window.

54. The method of claim 52, wherein said step (b) comprises the step of storing decoded instruction information.

55. The method of claim 52, wherein said step (b) comprises the step of storing a memory address of the instruction.

56. The method of claim 52, wherein said step (b) comprises the step of storing information specifying functional unit requirements.

57. The method of claim 52, wherein said step (b) comprises the step of storing information specifying a type of operation to be performed.

58. The method of claim 52, wherein said step (b) comprises the step of storing information specifying a storage location where instruction results are to be stored.

59. The method of claim 52, wherein said step (b) comprises the step of storing information specifying a storage location where instruction operands are stored.

60. The method of claim 52, wherein said step (b) comprises the step of storing information specifying a target address of an instruction.

61. The method of claim 52, wherein said step (b) comprises the step of storing information specifying immediate data to be used in an operation specified by the instruction.

62. The method of claim 52, wherein said step (d) comprises the step of applying said tags to read address ports of said plurality of register files to output said portions of instruction information, in program order, at corresponding read data ports of said plurality of register files.

* * * * *